Nov. 5, 1968 C. BOWNESS 3,409,843
SINGLE MODE LASER
Filed April 2, 1964 2 Sheets-Sheet 1
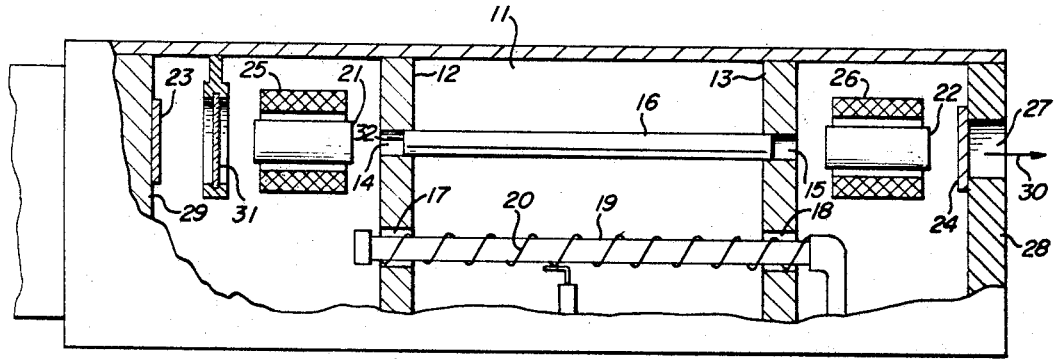
FIG. 1
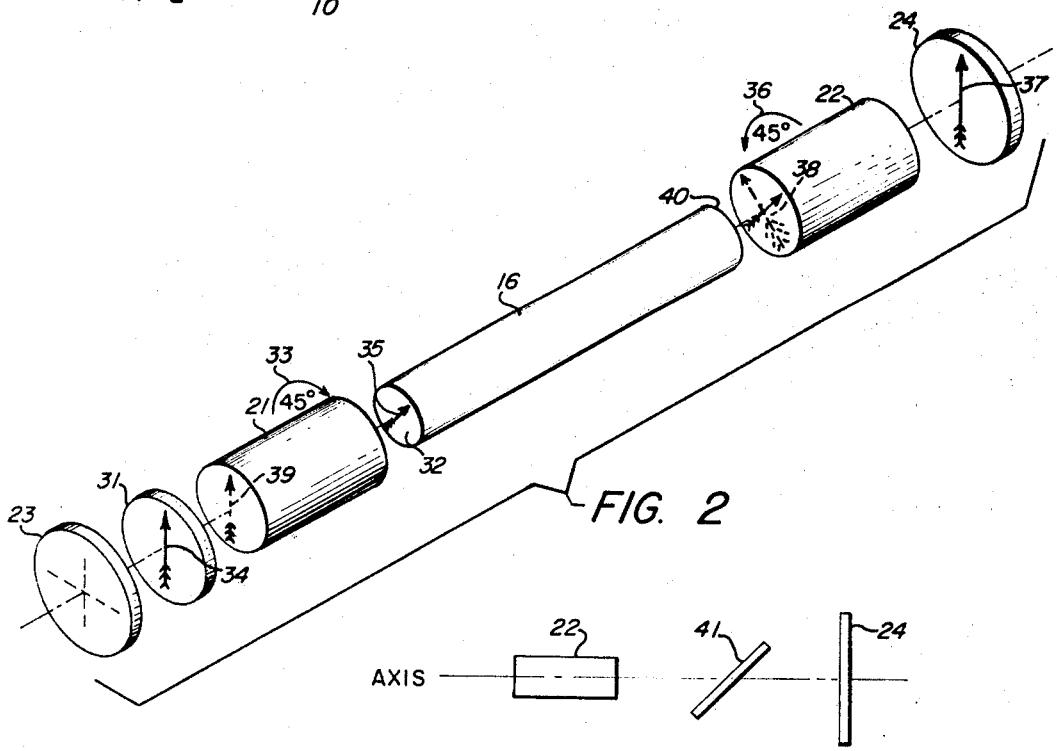
FIG. 2
FIG. 4
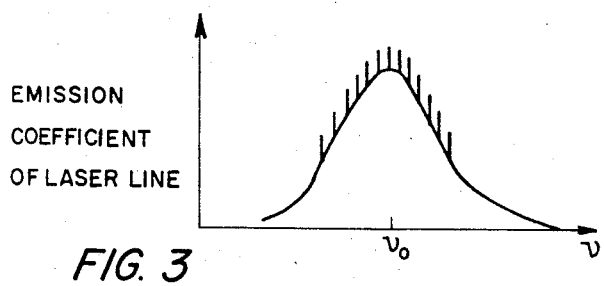
FIG. 3
INVENTOR
COLIN BOWNESS
BY
AGENT E FIELD OF
1st OSCILLATING
MODE INVERTED
POPULATION
WHEN ONLY
1st MODE
OSCILLATES E FIELD OF
2nd OSCILLATING
MODE

INVENTOR
COLIN BOWNESS

United States Patent Office 3,409,843
Patented Nov. 5, 1968

3,409,843
SINGLE MODE LASER
Colin Bowness, Weston, Mass., assignor to Raytheon Company, Lexington, Mass., a corporation of Delaware
Filed Apr. 2, 1964, Ser. No. 356,844
4 Claims. (Cl. 331—94.5)

ABSTRACT OF THE DISCLOSURE

A single mode laser including a reflecting cavity containing a laser element, 45° rotators at each end of the element and a polarizer for plane polarizing the radiation emitted from the ends of the laser element whereby emission from the respective ends of the element will be reflected back into the element and thence again through the system a multiplicity of times as a traveling wave.

---

This invention relates to the generation and amplification of coherent electromagnetic radiation and has particular reference to the generation and amplification of single mode spectra and to improved means and devices for producing regular spiking and single mode operation from a selected source.

Devices for producing coherent electromagnetic radiation of optical wavelength are known and comprise a body of coherent radiation-producing material which forms a resonant cavity placed within a reflector cavity together with a high intensity light source. The light source, aided by the reflector cavity directs energy into the coherent radiation-producing body. When the body is thus activated by large inputs of noncoherent light, coherent radiation of a particular wavelength is emitted therefrom. Such devices are commonly known as lasers or optical masers.

Lasers of the type employing crystals as the lasing media have had a multitude of individual monochromatic modes which go unstable simultaneously and show continuous random spiking in the output radiation. These standing wave lasers of the prior art produce multimodes in the output because the body of radiation-producing material is resonant to a number of modes whose frequency is separated by an amount equal to the velocity of light times the inverse of twice the length of the crystal.

It is desirable in a number of applications that the output of such solid state lasers be single mode and not have random spiking. Accordingly, the present invention describes a mechanism wherein single mode operation of a solid state laser is obtained.

The present invention comprises a solid state laser through which a traveling wave is propagated. More particularly, one specific illustrative embodiment of the present device comprises a laser medium positioned within a reflecting cavity so that radiation emitted from the medium is polarized and rotated by means such as a Faraday rotator as it travels along an optical path to a reflecting surface which directs it back through the polarizing system into the laser medium. At this point the radiation is rotated 90° from the input vector. The radiation then passes out the opposite end of the medium and becomes rotated by a second rotator as it passes to the second reflecting surface which directs it back once again through the second rotator whereupon it reenters the lasing medium polarized and rotated to be in the same direction as the input vector. This introduces a traveling wave into the lasing medium. Passing of the traveling wave through the lasing medium and elimination of any standing waves in the medium prevents the occurrence of multiple modes and provides single mode, regular spiking and continuous wave operation.

Other objects and advantages of the present invention will be better understood from the following detailed discussion taken in conjunction with the accompanying drawings, in which:

FIG. 1 is a schematic view of one embodiment of the present invention wherein unwanted multimode oscillation is suppressed and single mode oscillation is provided;

FIG. 2 is a schematic illustration of the optical system employed in the device of FIG. 1;

FIG. 3 is a diagram showing the emission coefficient and longitudinal cavity modes of a conventional ruby laser;

FIG. 4 is a schematic view of a modified optical system for the device of FIG. 1;

It has been suggested that the observed multimode spectra of a standing wave solid state laser medium, such as a ruby rod, can be explained due to slow spatial cross relaxation. In the conventional laser employing a ruby crystal which may be made into a resonant cavity by providing mirrors at both ends, there are many principal or axial modes observed in the output, which modes have a frequency spacing equal to the velocity of light times the inverse of twice the length of the crystal. In addition to these principal modes there are unresolved off-axes modes which differ in frequency only in the order of megacycles and whose presence is revealed by the fact that the angular beam spread is considerably larger than the expected diffraction limit.

The spectrum of the output of the usual standing wave solid state laser is as shown in FIG. 3 wherein some of the modes of the optical cavity are shown schematically. As the pump level is raised, the mode in the center of the line will reach oscillation threshold first. If the spectral cross relaxation was infinitely fast enough the line shape would be retained since the gain of this mode would be at infinity while all other modes would have only a finite gain and thus could not oscillate. However, since in most crystals the line broadening is due to the influence of lattice vibrations the energy can be transferred within the line in a time equal to the period of typical lattice vibrations. Thus, it is believed that the observed output modes are due to slow spatial cross relaxation and not due to slow spectral cross relaxation.

Figure 5:
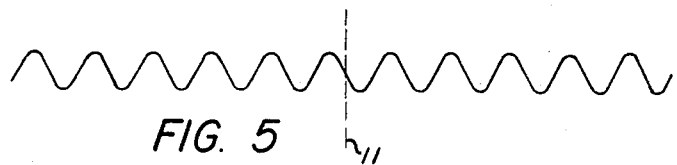
FIG. 5 is a diagram showing the field distribution of the first unstable longitudinal mode of a conventional ruby laser.
Figure 6:
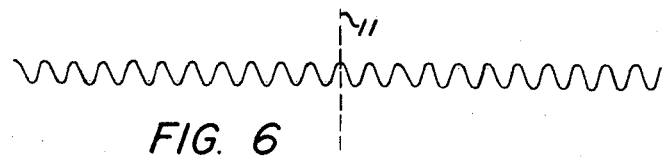
FIG. 6 is a diagram showing the field distribution of the inverted population density for the case where only the mode of FIG. 4 oscillates.
Figure 7:
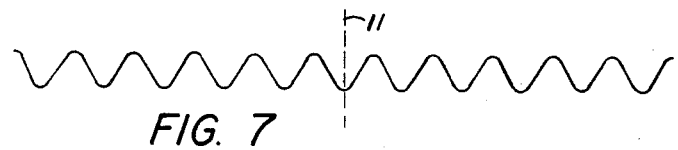
FIG. 7 is a diagram showing the field distribution of a second unstable longitudinal mode of a conventional ruby laser.

This is further explained in conjunction with FIGS. 5, 6 and 7 which illustrate output modes produced by a conventional solid state laser rod coated at both ends with a reflecting material so that the rod becomes a resonant cavity. If we now assume that one axial mode reaches threshold, then a standing wave of a particular wavelength, as shown for example in FIG. 5 is set up within the rod. The standing wave thus created has nodal planes half-wavelengths apart and in parallel with the reflecting surfaces. The induced emission thus produced by this standing wave is zero at the nodal planes and maximum therebetween. Assuming that no excitation can diffuse spatially, an inverted energy population having a maximum at the nodal planes and minima therebetween occurs as is shown in FIG. 6. This distribution of the energy population is unfavorable to maintain the first described oscillating mode since where the electric field of the mode is maxima the inverted population is minima, or at best, substantially reduced. Therefore, if a second axial mode (FIG. 7), which has a wavelength exceeding that of the first axial mode by half a wavelength more, now reaches threshold then it will grow in amplitude and oscillate. This is illustrated by line 11 where we find that in traversing both modes line 11 intersects a maxima for the second mode, a minima for the first mode, and a maxima for the inverted population. Thus, since the maxima of the electric field of the second mode occurs where there is maxima in the density of the excited states this mode will thus have more gain than the first mode which is already oscillating and therefore also go into oscillation. This is based, of course, upon the assumption that the two frequencies of the first and second modes are sufficiently close for otherwise the dependence upon the location of the frequency in the line is also of importance. This situation also occurs for the third, fourth, fifth, and subsequent modes.

It should be noted that the above discussion is concerned solely with the longitudinal modes. It is thus apparent that it is necessary in order to prevent the occurrence of multiple modes that standing waves within the laser rod be avoided.

Shown in FIG. 1 is a traveling wave laser according to this invention in which standing waves are prevented from existing and in which single mode operation is achieved. This device comprises a solid state radiation-producing means medium which is nonresonant and provided with a closed optical path or feedback loop containing means by which a wave initiated in the medium is propagated and returned to the medium. The radiation-producing medium preferably comprises a radiation-producing element such as a ruby rod adjacent which a high intensity input source such as a flash lamp is located in a reflecting cavity.

The device of FIG. 1 embodies a housing 10 which includes in its central area a cavity 11 having a pair of end walls 12 and 13. The walls have a pair of aligned openings 14–15 in which reside the opposite ends of a ruby rod 16 or other selected laser crystal, the ends of which rod may, if desired, be covered with suitable reflection-reduction coating to increase the amount of light which is enabled to pass into and out of the rod through its end surfaces.

Another pair of openings 17–18 in end walls 12–13 receive end portions of a flash lamp or tube 19 which is suitably connected into circuitry (not shown) whereby the tube may be flashed to emit a bright burst of illumination for a relatively short period of time in the known manner of flash tubes of this type. A helical wire 20, wound in widely spaced coils about the flash tube 19, provides a trigger for initiating the firing of the tube.

The output radiation producing member or rod 16 may comprise any suitable material capable of lasing in the known manner. In the preferred structure the rod 16 and flash tube 19 are physically shaped into rod-like configurations, and the portion of the housing 10 encircling cavity 11 is elliptical in shape, with the rod 16 and tube 19 being located parallel at respective foci of the ellipse. In this way a substantial amount of the pump light from the flash tube 19 is transmitted to the rod 16 without loss. For this purpose the inner surfaces of housing 10 and end walls 12–13 are made highly reflective.

When the rod 16 is pumped by the light from tube 19, population inversion of the atom energy levels of the rod occurs in the known manner. Such phenomenon is thoroughly described in copending U.S. patent application Ser. No. 182,529, filed Mar. 26, 1962 and assigned to the same assignee as the present application. Therefore, no explanation of the process of population inversion is believed necessary here.

Assuming that a first longitudinal mode of monochromatic radiative energy begins oscillating within the laser rod 11, it will be emitted from the rod at both ends. Adjacent each end of the rod 16 is a Faraday rotator 21–22 (FIGS. 1 and 2), and opposite each rotator is a mirror 23–24, thus completing a linear optical path, reading left to right in FIGS. 1 and 2, from mirror 23, through rotator 21, rod 16, and rotator 22 to mirror 24.

Each rotator 21–22 comprises a cylinder of, for example, lead oxide glass positioned within encircling magnets 25 and 26 respectively. Mirror 24 is positioned over a port or window 27 in the end wall 28 of the housing, and mirror 23 may be mounted on the opposite end wall 29. Mirror 24 is partially transparent so that when the radiation built up within the laser rod 16 eventually passes out of the device it is a sharply defined beam of coherent radiation denoted by arrow 30.

All of the optical elements are aligned on axis, as pointed out above, and a polarizer 31 is inserted in the system between one of the rotators 21 or 22 and the adjacent mirror. In FIGS. 1 and 2 the polarizer 31 is shown positioned between rotator 21 and mirror 23, but it can as well be located between rotator 22 and mirror 24. In fact separate polarizers may be used in each location, if desired, but in such a case the axes of polarization of the polarizers must be aligned.

Considering first the energy or radiation emitted from end 32 of rod 16, this energy in the form of light passes through Faraday rotator 21 which rotates the electric vectors 45° in the direction of the arrow 33 in FIG. 2. The light then passes through polarizer 31 where it is polarized, and impinges upon mirror 23. This light which impinges upon the mirror 23 is reflected back toward the rotator and has an electric vector as shown by the solid arrow 34. The light will pass unchanged through the polarizer 31 and will enter the rotator 21 where it will be rotated 45° and will enter the rod 16 at the angle shown by arrow 35. After passage through rod 16 it will enter rotator 22 at the same angle and will then be rotated 45° in the direction of arrow 36. Thus, the light impinging upon mirror 24 will be oriented as shown by arrow 37, will reenter rotator 22 at the same angle, and will emerge at a different angle, as indicated by dotted arrow 38. This light will then reenter rod 16 and pass through unchanged as to orientation, and will then again pass through rotator 21 and be rotated to the angle shown by dotted arrow 39. This process is repeated a large number of times as oscillation occurs.

It is to be understood that light emerging from the opposite end 40 of the rod will pass back and forth through the system and will be polarized and rotated similarly to light from end 32. In this way, there is achieved a cavity which has the desirable property that no standing waves exist within the active laser material, and further that may be aligned by simple auto-collimating techniques.

Although the polarizer 31 has been shown and described as the means for preventing waves having undesired planes of polarization from propagating through the system, this may be done by disposing a transparent member of glass, plastic, or the like, in the system at a predetermined angle to the axis of the system to completely linearly polarize the light reflected therefrom in accordance with Brewster's theory. This is schematically illustrated in FIG. 4 wherein between rotator 22 and mirror 24, for example, is positioned a glass member 41 which is disposed at the Brewster angle with respect to the axis of the system. Other means of introducing into the system surfaces disposed at the Brewster angle may be employed satisfactorily, in accordance with this invention, the object being to linearly polarize the stimulated emission from the laser rod so as to eliminate undesirable modes and permit the selected mode to pass through the system as a traveling wave.

The Faraday rotators have been described above as lead oxide glass elements subjected to axial magnetic fields formed by permanent magnets. However, the rotators may utilize coils connected to a suitable external source of energy in the well-known-manner, if desired, whereby they will function to rotate the plane of polarization of the light as desired. Such a Faraday rotator comprising a body of lead oxide glass may be approximately ten centimeters in length and has approximately a 0.1 minute/gauss-cm. Faraday rotation at optical frequency. The encircling coil or solenoid in such conditions should preferably be capable of applying a field strength of approximately 4,000 gauss to the rotator body, whereupon the light passing through the rotator is rotated 45°. A quartz rotator may consist, for example, of a standard quartz rotator well known and used in the optical art and is preferably cut to a length such that incoming polarized light is rotated 45° when the magnetic field in the solenoid is turned on.

Furthermore, any or all of the surfaces of the optical elements except mirrors 23 or 24 may be provided with means such as conventional coatings known to reduce reflection of light impinging upon these surfaces. This will result in increased transmissivity of the elements to light, reducing losses at the surfaces. Such antireflection coatings are preferably applied by vacuum deposition and may comprise, for example, single layers of magnesium fluoride deposited to a thickness equal to about one quarter-wavelength of radiation of about 0.8 micron wavelength. The antireflection coatings preferably have indexes of refraction less than that of the optical element whereby they thus minimize the reflection and consequent loss of useful emitted radiation.

It should be understood that each time the traveling wave passes along the body 21 of laser material in one direction it depletes the inversion population and thus gains in amplitude and intensity and further prevents the occurrence of other longitudinal modes. The light simultaneously emitted in the opposite direction completes the traveling wave and since the possibility of interference and occurrence of standing waves is eliminated the inverted population is continually depleted and depopulated in a uniform fashion so that no substantial unbalance can occur in the inverted population. Since substantial unbalance in the inverted population is avoided, the setting up and sustaining of a second oscillation mode is prevented.

Figure 8:
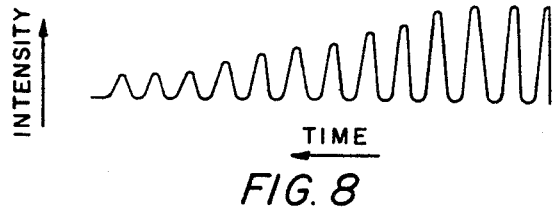
FIG. 8 is a diagram showing the output of the device of FIG. 1 when operated at just above the threshold for laser action.
Figure 9:
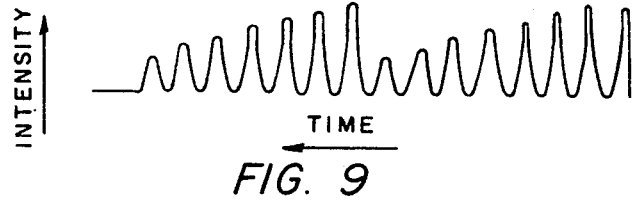
FIG. 9 is a diagram showing the output of the device of FIG. 1 when operated at input energy about 1% greater than the example of FIG. 8.
Figure 10:
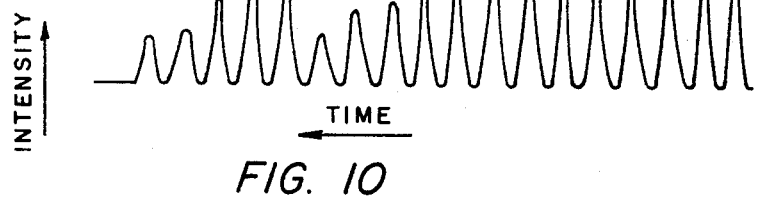
FIG. 10 is a diagram showing the output of the device of FIG. 1 when operated at input energy about 2% greater than the example of FIG. 8.

The experimental results obtained with such a device as described in FIGS. 1 and 2 are shown in FIGS. 8, 9 and 10. FIG. 8 shows the output of the device of FIG. 1 when operated at just above the threshold for laser action, FIG. 9 shows the output of the device when operated at input energy about 1% greater than the example of FIG. 8, and FIG. 10 shows the output of the device when operated at input energy about 2% greater than the example of FIG. 8.

When the device is made operative in a normal manner without the use of the polarizer and rotators, the well-known random spiking output of the laser is obtained. When however, the rotators and polarizer are included in the system so that a 45° rotation of polarized light is obtained, then a significant change in the laser output is observed.

For example, in FIG. 8 wherein the device is near threshold, the laser output shows completely regular damped spiking output as the simple single mode theory predicts.

As the pump power is increased, the output pattern becomes less regular as indicated in FIGS. 9 and 10.

This slight irregularity observed at the higher pumping levels may be due to the presence of off-axial modes of oscillation, since these modes cannot be suppressed by the oscillator but can be suppressed only by lenses and aperture plates inserted in the light path.

Since, as is shown particularly in FIG. 8, the amplitude of the radiation reaches a uniform level before tapering off, continuous wave operation of the device is obtained in that a uniform amplitude of output radiation is sustained.

It will be apparent that although a solid state laser using a ruby rod has been described as a preferred embodiment, the present invention is applicable to lasers utilizing other well-known solid state media and is also applicable to so-called gaseous lasers. It is to be understood that other modifications may be made in the structures shown and described without departing from the spirit of the invention. Therefore, the present invention should not be limited to the described embodiments except as defined by the appended claims.

What is claimed is:

1. A device for producing substantially single mode output from a laser, comprising a radiation generating medium, means for pumping said medium to produce radiation from both ends thereof, a reflecting cavity including reflecting elements positioned in spaced relation with each end of the medium for reflecting said radiation back toward the medium, and optical means within the cavity for passing radiation from the respective ends of the medium back into the medium and for creating a traveling wave within the medium, said optical means comprising polarizing means between said medium and one of said reflecting elements for intercepting said radiation and discarding therefrom all but a selected mode having a given plane of polarization, and a pair of 45° optical rotators located within the cavity one at each end of the medium for intercepting said selected mode and rotating the plane of polarization thereof in opposite directions.

2. A device substantially as set forth in claim 1 wherein said polarizing means is a flat transparent member located in the path of said radiation at the Brewster angle with respect to the direction of propagation of said radiation.

3. A device substantially as set forth in claim 1 wherein said polarizing means is a plane polarizer.

4. A linear device for producing substantially single mode output from a laser, comprising a radiation generating medium, means for pumping said medium to produce radiation from the ends thereof, said radiation passing in opposite directions along a single optical axis, and an optical system arranged on said optical axis comprising a pair of reflecting elements positioned one opposite each end of the medium in spaced relation therewith for reflecting said radiation back into the medium, polarizing means between said medium and one of said reflecting elements for intercepting said radiation and discarding therefrom all but a selected mode having a given plane of polarization, and optical rotating means for intercepting said selected mode and rotating the plane of polarization thereof to create a traveling wave within the medium, said rotating means comprising a pair of Faraday rotators located one at each end of the medium, said rotators being operable to rotate said plane of polarization 45° in opposite directions from one another.

References Cited

UNITED STATES PATENTS 3,229,223   1/1966   Miller _____ 331—94.5
3,277,392   10/1966  Nicolai _____ 331—94.5

JEWELL H. PEDERSEN, *Primary Examiner.*

RONALD L. WIBERT, *Assistant Examiner.*